United States Patent
Takahashi

(10) Patent No.: US 11,327,703 B2
(45) Date of Patent: May 10, 2022

(54) IMAGE FORMING SYSTEM AND VOLTAGE ADJUSTMENT METHOD

(71) Applicant: TOSHIBA TEC KABUSHIKI KAISHA, Tokyo (JP)

(72) Inventor: Koji Takahashi, Sumida Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/133,012

(22) Filed: Dec. 23, 2020

(65) Prior Publication Data

US 2021/0286575 A1 Sep. 16, 2021

Related U.S. Application Data

(63) Continuation of application No. 16/817,494, filed on Mar. 12, 2020, now Pat. No. 10,908,862.

(51) Int. Cl.
*G06F 3/12* (2006.01)
*G03G 21/20* (2006.01)
*G03G 15/00* (2006.01)

(52) U.S. Cl.
CPC .......... *G06F 3/1291* (2013.01); *G03G 15/80* (2013.01); *G03G 21/203* (2013.01); *G06F 3/1256* (2013.01)

(58) Field of Classification Search
CPC ..... G06F 3/1291; G06F 3/1256; G03G 15/80; G03G 21/203
USPC ...................................................... 358/1.15
See application file for complete search history.

(56) References Cited

U.S. PATENT DOCUMENTS

| 7,824,018 | B2 ‡ | 11/2010 | Shida ................. | G03G 15/5029 347/71 |
| 8,854,637 | B2 ‡ | 10/2014 | Kim ..................... | H04L 41/0816 358/1.13 |
| 9,195,179 | B2 ‡ | 11/2015 | Shimizu ............. | G03G 15/1605 |
| 10,671,792 | B2 * | 6/2020 | Christo ................ | G06F 30/392 |
| 2002/0140974 | A1 * | 10/2002 | Imaizumi ........... | H04N 1/00954 358/1.15 |
| 2006/0274368 | A1 * | 12/2006 | Imine ................. | H04N 1/00896 358/1.15 |
| 2007/0244928 | A1 ‡ | 10/2007 | Ueno ................. | G03G 15/5079 |
| 2009/0033993 | A1 ‡ | 2/2009 | Nakazato ............. | G06F 3/1218 358/1.15 |
| 2011/0063665 | A1 ‡ | 3/2011 | Hirakawa ............ | G06F 3/1285 358/1.15 |

(Continued)

OTHER PUBLICATIONS

Notice of Allowance on U.S. Appl. No. 16/817,494 dated Oct. 15, 2020.

*Primary Examiner* — Allen H Nguyen
(74) *Attorney, Agent, or Firm* — Foley & Lardner LLP

(57) ABSTRACT

A server includes a transceiver and a controller. The transceiver is configured to facilitate communication with a plurality of image forming apparatuses. The controller is configured to receive adjustment information from each of the plurality of images forming apparatuses, determine an updated adjustment value to be used in each of the plurality of image forming apparatuses based on the adjustment information received from of each of the plurality of image forming apparatuses, and transmit adjustment update information including the updated adjustment value to each of the plurality of image forming apparatuses.

9 Claims, 8 Drawing Sheets

(56) References Cited

U.S. PATENT DOCUMENTS

| | | | |
|---|---|---|---|
| 2011/0085816 A1* | 4/2011 | Kim | H02H 3/42 |
| | | | 399/88 |
| 2011/0157624 A1‡ | 6/2011 | Nishikawa | H04N 1/00053 |
| | | | 358/1.15 |
| 2013/0100472 A1‡ | 4/2013 | Kamoi | H04N 1/32646 |
| | | | 358/1.13 |
| 2014/0185084 A1‡ | 7/2014 | Cudak | G06F 3/126 |
| | | | 358/1.15 |
| 2014/0185096 A1‡ | 7/2014 | Tokunaga | G03G 21/20 |
| | | | 358/1 |
| 2017/0024171 A1* | 1/2017 | Abe | G06F 3/1212 |
| 2019/0243290 A1‡ | 8/2019 | Sanmonji | G03G 15/55 |
| 2020/0225887 A1‡ | 7/2020 | Ito | G06F 3/1256 |

\* cited by examiner
‡ imported from a related application

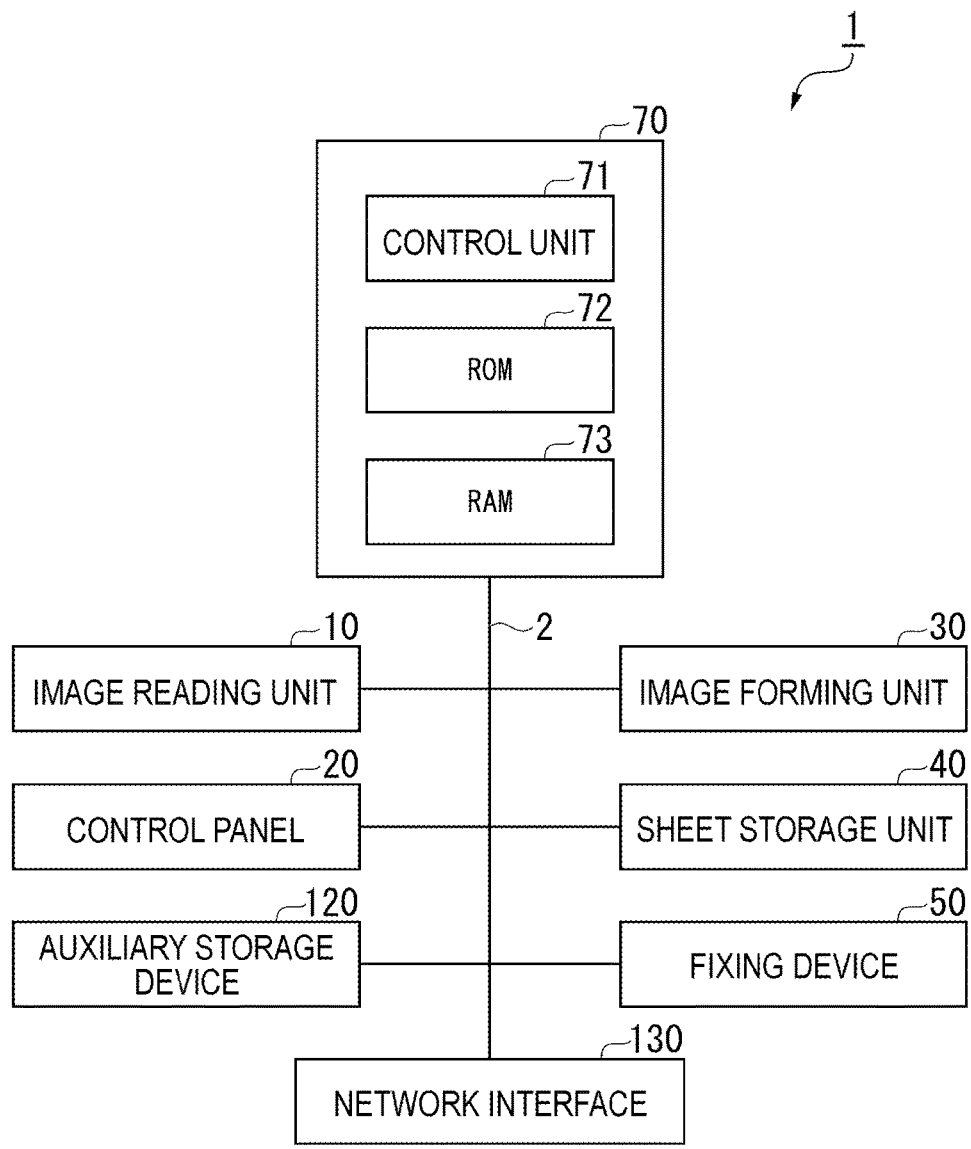

| APPARATUS IDENTIFICATION ID | INSTALLATION LOCATION | ADJUSTMENT INFORMATION | | | | | |
|---|---|---|---|---|---|---|---|
| | | TYPE OF PAPER | TEMPERATURE INSIDE APPARATUS (°C) | HUMIDITY INSIDE APPARATUS (%) | COLOR / MONOCHROME | ADJUSTMENT VALUE | |
| | | | | | | FRONT SURFACE | BACK SURFACE |
| AAA | 111 | PLAIN PAPER | 30 | 85 | COLOR | −2 | +2 |
| BBB | 222 | PLAIN PAPER | 23 | 50 | COLOR | +3 | −3 |
| CCC | 333 | THICK PAPER | 10 | 20 | MONOCHROME | 0 | 0 |
| ⋮ | ⋮ | ⋮ | ⋮ | ⋮ | ⋮ | ⋮ | ⋮ |

FIG. 7

| | | HUMIDITY (%) | | | | | | |
|---|---|---|---|---|---|---|---|---|
| | | 0~10 | 11~20 | 21~30 | 31~40 | 41~50 | 51~60 | 61~70 | ... |
| ADJUSTMENT VALUE | 7 | 870 | 665 | 525 | 420 | 385 | 350 | 231 | ... |
| | 6 | 994 | 760 | 600 | 480 | 440 | 400 | 264 | ... |
| | 5 | 1119 | 855 | 675 | 540 | 495 | 450 | 297 | ... |
| | 4 | 1243 | 950 | 750 | 600 | 550 | 500 | 330 | ... |
| | 3 | 1367 | 1045 | 825 | 660 | 605 | 550 | 363 | ... |
| | 2 | 1492 | 1140 | 900 | 720 | 660 | 600 | 396 | ... |
| | 1 | 1616 | 1235 | 975 | 780 | 715 | 650 | 429 | ... |

FIG. 8

START
↓
ACT101: RECEIVE INPUT OF VARIOUS PIECES OF INFORMATION
↓
ACT102: OUTPUT IMAGE SAMPLE
↓
ACT103: DISPLAY ADJUSTMENT SCREEN
↓
ACT104: RECEIVE INPUT OF ADJUSTMENT VALUE
↓
ACT105: TRANSMIT ADJUSTMENT INFORMATION
↓
END

IMAGE FORMING SYSTEM AND VOLTAGE ADJUSTMENT METHOD

CROSS-REFERENCE TO RELATED PATENT APPLICATION

This application is a continuation of U.S. patent application Ser. No. 16/817,494, filed Mar. 12, 2020, the entire contents of which are incorporated herein by reference.

FIELD

Embodiments described herein relate generally to an image forming system and a voltage adjustment method.

BACKGROUND

Environmental conditions such as temperature and humidity can affect image quality during the transfer of an image to paper using an image forming apparatus. Therefore, a method of determining an applied voltage based on information from a temperature and humidity sensor with reference to an expected control value obtained by a test or the like in advance is performed. However, there are also a plurality of types of paper used in the image forming apparatus, and the resistance value varies for each paper. For this reason, depending on the type of paper, a control error may occur due to inconsistency with the expected control value or a variation in the environmental sensor, and the quality of the image may be degraded due to the variation in the paper.

DESCRIPTION OF THE DRAWINGS

FIG. 3 is a block diagram illustrating a hardware configuration of the image forming apparatus of FIG. 2;

FIG. 4 is a diagram illustrating an example of an applied voltage table according to the embodiment;

FIG. 7 is a diagram illustrating an example of an applied voltage adjustment value table according to the embodiment;

FIG. 8 is a flowchart illustrating a flow of adjustment information transmission processing performed by the image forming apparatus;

DETAILED DESCRIPTION

In general, according to one embodiment, the image forming system includes a plurality of image forming apparatuses and a server system. The image forming apparatus includes a communication unit and a control unit. The communication unit (i) transmits adjustment information including an adjustment value of the voltage applied at the time of transfer adjusted according to a user operation to the server system, and (ii) receives adjustment update information including an adjustment value determined based on the adjustment information from the server system. The control unit controls the applied voltage at the time of transfer based on the adjustment value included in the adjustment update information received by the communication unit. The server system includes a control unit and a communication unit. The control unit determines an adjustment value to be used in each of the plurality of image forming apparatuses using the adjustment information transmitted from each of the plurality of image forming apparatuses. The communication unit transmits adjustment update information including the determined adjustment value to each of the plurality of image forming apparatuses.

Figure 1:
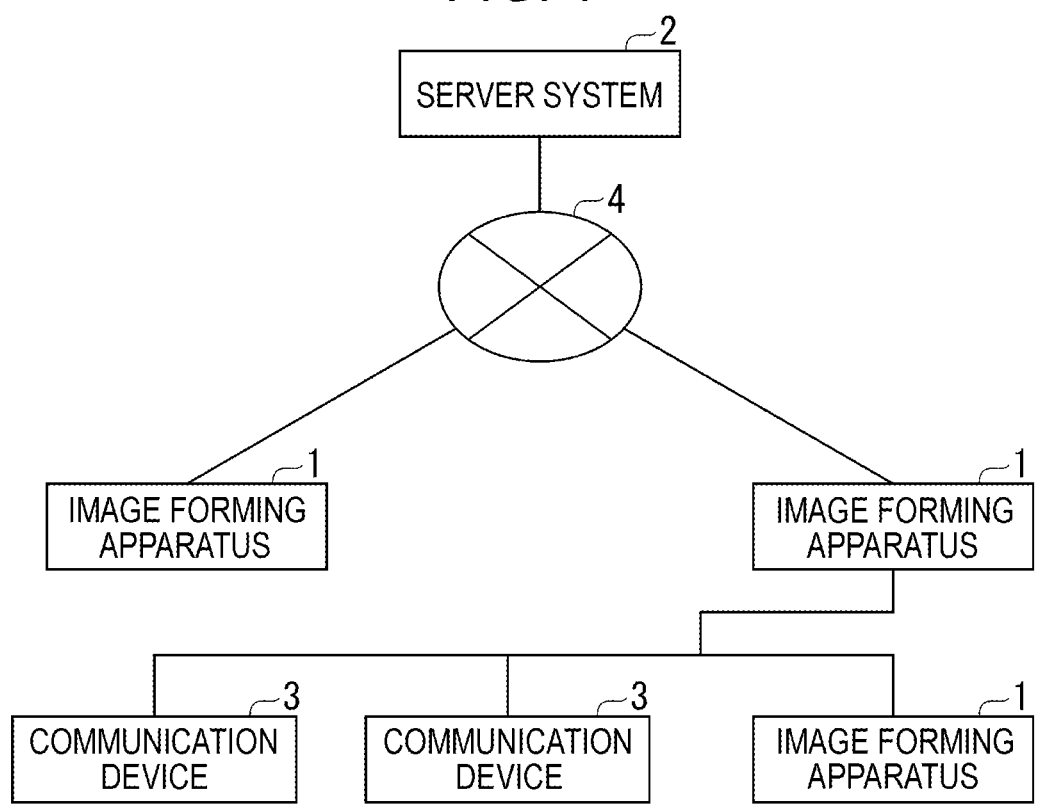
FIG. 1 is a diagram illustrating a configuration example of an image forming system according to an embodiment.

Hereinafter, an image forming system and a voltage adjustment method according to an embodiment will be described with reference to the drawings. FIG. 1 is a diagram illustrating an image forming system 100 according to an embodiment. The image forming system 100 includes a plurality of image forming apparatuses 1 and a server system 2 (e.g., a server, a remote server, etc.). The plurality of image forming apparatuses 1 may be all installed at the same place, some may be installed at the same place, or all may be installed at different places. When the image forming apparatus 1 is installed in a company, a communication device 3 and an image forming apparatus 1 may be connected under another image forming apparatus 1, as shown in FIG. 1. The plurality of image forming apparatuses 1 and the server system 2 are communicably connected via a network 4. The network 4 may be any configuration of a network. For example, the network 4 may be the Internet or a local area network (LAN).

The image forming apparatus 1 is a multifunction peripheral (MFP). The image forming apparatus 1 executes printing according to an image forming process and an image fixing process. The image forming process is a process of forming an image on a sheet. The image fixing process is a process of fixing an image formed on the sheet. The sheet is, for example, paper on which letters and images are formed. The sheet may be any sheet as long as the image forming apparatus 1 can form an image thereon.

The image forming apparatus 1 can adjust the voltage applied at the time of transfer according to a user operation. In the image forming apparatus 1, the quality of the image at the time of transfer varies depending on the environment in the apparatus. According to an exemplary embodiment, the image forming apparatus 1 reduces the influence of the environment at the time of transfer by adjusting the voltage applied by the user at the time of transfer. The voltage adjusted by the image forming apparatus 1 is a voltage determined for each sheet according to environmental conditions (for example, temperature and humidity inside the image forming apparatus 1). The image forming apparatus 1 determines the output condition at the time of transfer with the sum of a first voltage determined by detecting the resistance value of a resistor and a second voltage determined according to an environmental condition correlated with the sheet resistance value. The resistor is a conductive roller, a transfer belt, or the like.

The image forming apparatus 1 transmits adjustment information to the server system 2. The adjustment information includes at least a type of paper, environmental conditions, a print mode, and a voltage adjustment value for each print surface (front surface and back surface). The type of paper represents, for example, plain paper, thick paper, or the like. The environmental condition indicates, for example, at least one of temperature and humidity inside the image forming apparatus 1. The print mode indicates a mode at the time of printing of the image forming apparatus 1, and includes, for example, a color print mode or a monochrome print mode. The voltage adjustment value is a value for adjusting the voltage. In the present embodiment, it is assumed that the voltage adjustment value can be set in seven stages from "1" to "7". In this case, the voltage adjustment value of the image forming apparatus 1 in the initial state is "4". Each time the voltage adjustment value increases by one stage, the voltage value increases, and vice versa. The image forming apparatus 1 determines the second voltage considering the adjustment value. The image forming apparatus 1 receives, from the server system 2, adjustment update information including an adjustment value determined by the server system 2 based on the adjustment information. The image forming apparatus 1 controls the applied voltage at the time transfer based on the adjustment value included in the received adjustment update information. That is, the image forming apparatus 1 determines the second voltage based on the adjustment value included in the received adjustment update information.

The server system 2 determines an adjustment value for each of the plurality of image forming apparatuses 1. Specifically, the server system 2 receives adjustment information from each of the plurality of image forming apparatuses 1 and obtains an adjustment value to be used in each of the plurality of image forming apparatuses 1 using the received adjustment information. More specifically, the server system 2 obtains an adjustment value for each combination of a type of paper, a print mode, and a print surface according to an environmental condition (for example, at least one of temperature and humidity inside the image forming apparatus 1). The server system 2 is configured using one or more information processing apparatuses.

The communication device 3 is a device that instructs the image forming apparatus 1 to perform printing. The communication device 3 is configured using an information processing apparatus such as a personal computer, a notebook computer, a tablet terminal, a mobile terminal, and the like.

In the image forming system 100 according to the embodiment, the server system 2 collects adjustment information from the plurality of image forming apparatuses 1. The server system 2 uses the collected adjustment information to obtain an adjustment value to be used in each of the plurality of image forming apparatuses 1. At this time, the server system 2 determines the adjustment value using the adjustment value of the type of paper, the environmental condition, the print mode and the voltage adjustment value for each print surface, which are included in the collected adjustment information. The server system 2 transmits adjustment update information including the determined adjustment value to each of the plurality of image forming apparatuses 1. The plurality of image forming apparatuses 1 update the adjustment value using the adjustment update information transmitted from the server system 2. Then, at the time of printing, the plurality of image forming apparatuses 1 adjust the image density with an adjustment value corresponding to the environmental condition and perform printing. As a result, it is possible to eliminate transfer failure due to variations in sheet resistance and to provide stable image quality.

Figure 2:
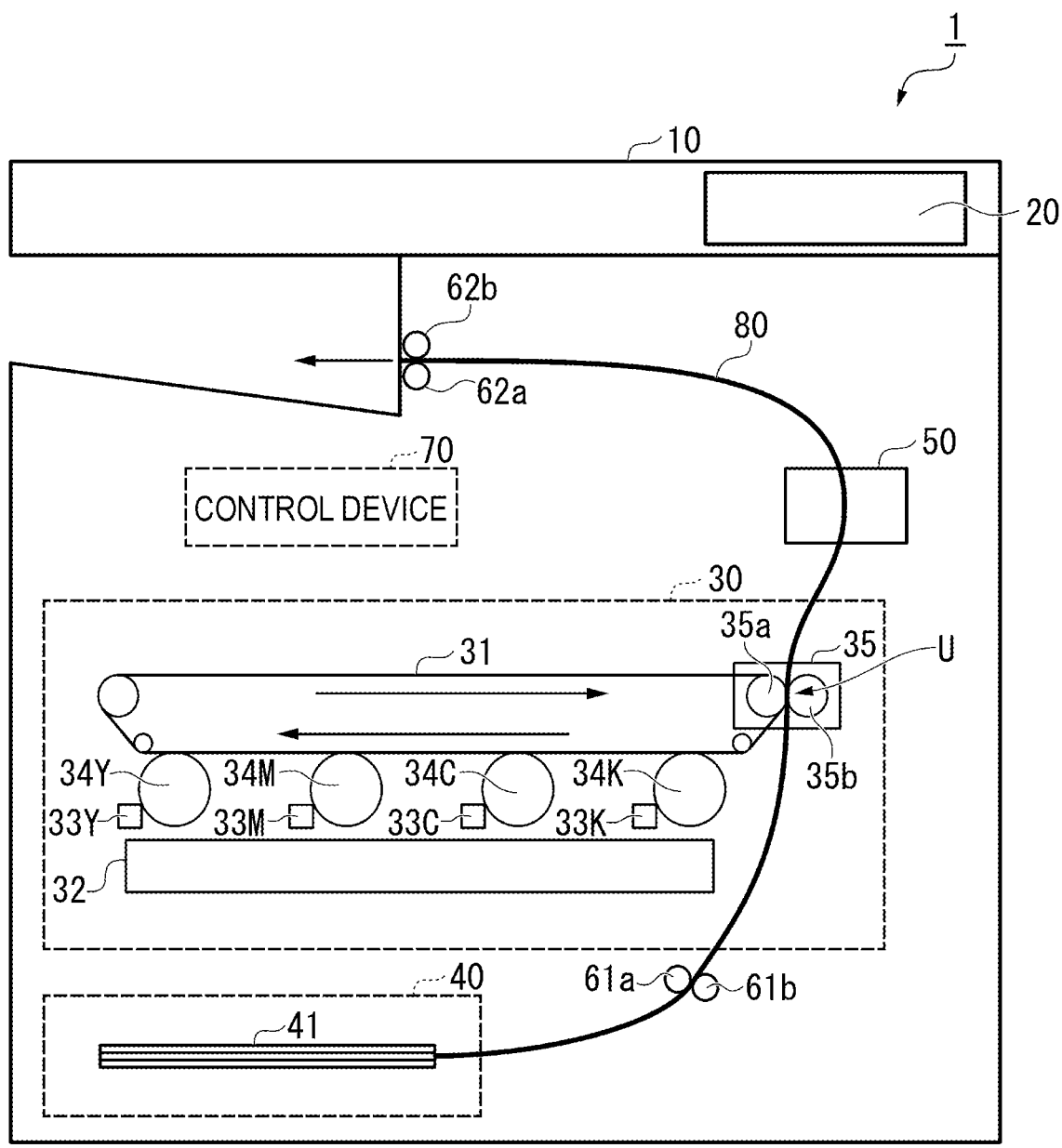
FIG. 2 is a schematic diagram illustrating an image forming apparatus of the image forming system of FIG. 1 according to the embodiment.

FIG. 2 is a diagram illustrating an example of the image forming apparatus 1 according to the embodiment. The image forming apparatus 1 includes an image reading unit 10 (scanner), a control panel 20 (user input device, user interface, etc.), an image forming unit 30 (printing assembly), a sheet storage unit 40, a fixing device 50, conveyance rollers 61a and 61b, sheet discharge rollers 62a and 62b, and a control device 70 (a first controller). The image reading unit 10 reads an image on a document as brightness and darkness. For example, the image reading unit 10 reads an image printed on a sheet as a reading target set on a document reading table. The image reading unit 10 records the read image information. The recorded image information may be transmitted to another information processing apparatus via a network. The recorded image information may be an image formed on a sheet by the image forming unit 30 as print data.

The control panel 20 includes a display unit and an operation unit. The display unit is a display device such as a liquid crystal display and an organic electro luminescence (EL) display. The display unit displays various information related to the image forming apparatus 1 and an adjustment screen under the control of the control device 70. The adjustment screen is a screen for receiving an input of an adjustment value for adjusting the applied voltage at the time of transfer. When the user inputs an adjustment value on the adjustment screen, the voltage applied at the time of transfer is adjusted. The operation unit includes a plurality of buttons and the like. The operation unit receives a user operation. For example, the operation unit receives a print execution instruction and an input regarding an adjustment value. The operation unit outputs a signal corresponding to an operation performed by the user to the control device 70. The display unit and the operation unit may be configured as an integrated touch panel.

The image forming unit 30 performs an image forming process. Specifically, the image forming unit 30 forms an image on a sheet based on the image information generated by the image reading unit 10 or the image information received via the communication path. For example, the image forming unit 30 forms a toner image on a sheet using toner.

The image forming unit 30 includes a transfer belt 31, an exposure unit 32, a plurality of developing devices including developing devices 33Y, 33M, 33C, and 33K, a plurality of photosensitive drums including photosensitive drums 34Y, 34M, 34C, and 34K, and a transfer unit 35. The transfer belt 31 is an endless intermediate transfer body. The transfer belt 31 rotates in the direction indicated by the arrow (e.g., clockwise) due to the rotation of a roller.

The exposure unit 32 is provided at a position between (i) the developing devices 33Y, 33M, 33C, and 33K and (ii) a charger (not shown), facing the photosensitive drums 34Y, 34M, 34C, and 34K. The exposure unit 32 irradiates the surface (photoconductor layer) of each of the photosensitive drums 34Y, 34M, 34C, and 34K with a laser beam based on image information. The direction in which the laser beam scans the photosensitive drum is the main scanning direction, and the direction orthogonal to the main scanning direction is the sub-scanning direction. For example, in the present embodiment, the main scanning direction coincides with the axial direction of the photosensitive drums 34Y, 34M, 34C, and 34K, and the sub-scanning direction coincides with the rotation direction of the transfer belt.

By the irradiation of the laser beam, the charges on the surfaces (photoconductor layers) of the photosensitive drums 34Y, 34M, 34C, and 34K disappear. As a result, an electrostatic pattern is formed on the surfaces of the photosensitive drums 34Y, 34M, 34C, and 34K at the position irradiated with the laser beam. That is, an electrostatic latent image is formed on the surfaces of the photosensitive drums 34Y, 34M, 34C, and 34K by the irradiation of the laser beam by the exposure unit 32. The exposure unit 32 may use a light emitting diode (LED) beam instead of a laser beam. The light emission of the exposure unit 32 is controlled based on image information under the control of the control device 70.

The developing devices 33Y, 33M, 33C, and 33K supply toner to the photosensitive drums 34Y, 34M, 34C, and 34K. For example, the developing device 33Y develops the electrostatic latent image on the surface of the photosensitive drum 34Y with yellow (Y). The developing device 33M develops the electrostatic latent image on the surface of the photosensitive drum 34M with magenta (M). The developing device 33C develops the electrostatic latent image on the surface of the photosensitive drum 34C with cyan (C). The developing device 33K develops the electrostatic latent image on the surface of the photosensitive drum 34K with black (K) toner.

The developing devices 33Y, 33M, 33C, and 33K form toner images as visible images on the photosensitive drums 34Y, 34M, 34C, and 34K. The toner images formed on the photosensitive drums 34Y, 34M, 34C, and 34K are transferred (primary transfer) onto the transfer belt 31 by a plurality of primary transfer rollers (not shown). A plurality of primary transfer rollers are provided at positions opposed to the photosensitive drums 34Y, 34M, 34C, and 34K with the transfer belt 31 interposed therebetween.

The transfer unit 35 includes an opposing roller 35a and a secondary transfer roller 35b. The transfer unit 35 transfers the toner image on the transfer belt 31 to the sheet 41 at a secondary transfer position U. The secondary transfer position U is a position where the opposing roller 35a and the secondary transfer roller 35b face each other with the transfer belt 31 interposed therebetween. The transfer unit 35 determines the output condition at the time of transfer, for example, with the sum of a first voltage determined by detecting the resistance value of the resistor (e.g., a conductive roller, a transfer belt, etc.) and a second voltage determined according to environmental conditions correlated with the sheet resistance value. The transfer unit 35 transfers the toner image on the transfer belt 31 to the sheet 41 based on a voltage according to the determined output condition.

The sheet storage unit 40 includes a single or a plurality of paper feed cassettes. The sheet feed cassette stores sheets 41 of a predetermined size and/or a predetermined type. The sheet feed cassette includes a pickup roller. The pickup roller takes out the sheets 41 one by one from the sheet feed cassette. The pickup roller supplies the taken sheet 41 to a conveyance unit 80.

The fixing device 50 performs an image fixing process. Specifically, the fixing device 50 heats and pressurizes the sheet 41 to fix an image (for example, a toner image) formed on the sheet 41 by the image forming unit 30 to the sheet 41.

The conveyance rollers 61a and 61b supply the sheet 41 fed from the sheet feed cassette to the image forming unit 30. The conveyance rollers 61a and 61b are installed at the positions opposite to each other. The sheet discharge rollers 62a and 62b discharge the sheet 41 on which the image is formed and then fixed thereto by the fixing device 50 to a discharge unit. The sheet discharge rollers 62a and 62b are installed at the positions opposite to each other.

The control device 70 controls each functional unit of the image forming apparatus 1. For example, the control device 70 determines the second voltage according to the humidity and/or temperature inside the apparatus measured by an environment sensor (not shown). The conveyance unit 80 conveys the sheet 41. The conveyance unit 80 includes a conveyance path and a plurality of rollers (not shown). The conveyance path is a path along which the sheet 41 is conveyed. The rollers convey the sheet 41 by rotating under the control of the control device 70.

FIG. 3 is a block diagram illustrating a hardware configuration of the image forming apparatus 1 according to the embodiment. FIG. 3 illustrates only a characteristic hardware configuration of the image forming apparatus 1 according to the present embodiment. The image forming apparatus 1 includes the image reading unit 10, the control panel 20, the image forming unit 30, the sheet storage unit 40, the fixing device 50, the control device 70, an auxiliary storage device 120, and a network interface 130 (a communications interface, a first transceiver, etc.). Each functional unit is connected via a system bus 11 so that data communication is possible.

The control device 70 includes a control unit 71, a read only memory (ROM) 72, and a random access memory (RAM) 73. The control unit 71 is, for example, a processor such as a central processing unit (CPU) and/or a graphics processing unit (GPU). The control unit 71 controls the operation of each functional unit of the image forming apparatus 1. The control unit 71 executes various processes by loading a program stored in the ROM 72 into the RAM 73 and executing the program. An application specific integrated circuit (ASIC) may have an appropriate function realized by the control unit 71. The ASIC is a dedicated circuit for realizing a specific function.

The ROM 72 stores a program for operating the control unit 71. The RAM 73 is a memory that temporarily stores data used by each functional unit included in the image forming apparatus 1. The RAM 73 may store digital data generated by the image reading unit 10. The RAM 73 may temporarily store a job and a job log.

The auxiliary storage device 120 is, for example, a hard disk or a solid state drive (SSD). The auxiliary storage device 120 stores various data. Various data stored in the auxiliary storage device 120 are, for example, digital data, a job, a job log, an applied voltage table, an adjustment value, and the like. The applied voltage table is a table in which voltage values corresponding to the sheet resistance for each humidity level are registered from the relationship between the sheet resistance value and the applied voltage. In the applied voltage table, a reference voltage serving as a reference for determining the second voltage is registered for each combination of the paper and the humidity. The adjustment value stored in the auxiliary storage device 120 is a reference value ("4" in the present embodiment) when the image forming apparatus 1 is in an initial state (for example, at the time of purchase or initialization). On the other hand, when the adjustment value is obtained from the server system 2, the obtained adjustment value is stored. For example, adjustment values are stored in the auxiliary storage device 120 for each combination of the type of paper, the print mode, and the print surface.

FIG. 4 is a diagram illustrating an example of an applied voltage table according to the embodiment. The value of the applied voltage is registered in the applied voltage table for each combination of the type of paper and humidity. The value of the applied voltage registered in the applied voltage table is a reference voltage. Therefore, in the case of the reference adjustment value ("4" in the present embodiment), the value of the applied voltage registered in the applied voltage table is the second voltage. When the adjustment value is higher than the reference adjustment value, a value obtained by weighting the reference voltage by a predetermined value becomes the second voltage. The weighting is calculated by the image forming apparatus 1 for each adjustment value.

Referring back to FIG. 3, the network interface 130 transmits and receives data to and from the external devices. Here, external devices include, for example, another image forming apparatus 1, the server system 2, and the communication device 3. The network interface 130 operates as an input interface, and receives print data, instructions, and adjustment update information transmitted from the external devices. The instruction transmitted from the external devices is, for example, a print execution instruction, and the like. The network interface 130 operates as an output interface and transmits adjustment information to the server system 2. The network interface 130 may transmit the adjustment information at a preset time, or may transmit the adjustment information every time adjustment is performed by a user. When transmitting the adjustment information at a preset time, the adjustment information may be temporarily stored in the auxiliary storage device 120. When transmitting the adjustment information at a preset time, the network interface 130 may transmit the latest adjustment information.

Figures 5, 6:
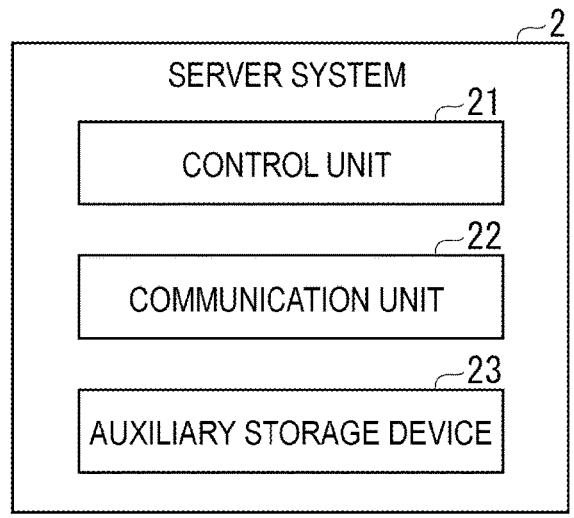
FIG. 5 is a block diagram illustrating a server system of the image forming system of FIG. 1 according to the embodiment.
FIG. 6 is a diagram illustrating an example of an image forming apparatus information table according to the embodiment.

FIG. 5 is a diagram illustrating a configuration of the server system 2 of the embodiment. The server system 2 includes a control unit 21 (a second controller), a communication unit 22 (a communications interface, a second transceiver, etc.), and an auxiliary storage device 23. The control unit 21 is, for example, a processor such as a CPU and/or a GPU. The control unit 21 controls the operation of each functional unit of the server system 2. The ASIC may have an appropriate function realized by the control unit 21. The control unit 21 determines an adjustment value to be used in each of the plurality of image forming apparatuses 1 using, for example, the adjustment information transmitted thereto from each of the plurality of image forming apparatuses 1. The control unit 21 classifies the plurality of image forming apparatuses 1 into a plurality of groups based on predetermined criteria, for example. The control unit 21 may classify the plurality of image forming apparatuses 1 into a plurality of groups according to places or regions where the plurality of image forming apparatuses 1 are installed/located. The control unit 21 determines an adjustment value for a grouping of the image forming apparatuses 1 using the adjustment information transmitted from the image forming apparatuses 1 belonging to that group.

The communication unit 22 communicates with the image forming apparatuses 1. The communication unit 22 receives the adjustment information transmitted from the image forming apparatuses 1, for example. The communication unit 22 transmits, for example, adjustment update information to the image forming apparatuses 1. The auxiliary storage device 23 is, for example, a hard disk or an SSD. The auxiliary storage device 23 stores an image forming apparatus information table and an applied voltage adjustment value table. The image forming apparatus information table is a table in which information on the image forming apparatuses 1 is registered. The applied voltage adjustment value table is a table in which the value of the applied voltage for each combination of the adjustment value and the humidity is registered. The auxiliary storage device 23 stores the applied voltage adjustment value table.

FIG. 6 illustrates an example of an image forming apparatus information table according to the embodiment. The image forming apparatus information table includes a plurality of records in which values of apparatus identification ID, installation location, and adjustment information are registered for a plurality of image forming apparatuses 1. The apparatus identification ID is identification information for identifying each image forming apparatus 1. The apparatus identification ID may be, for example, a serial number of a respective image forming apparatus 1 or a media access control (MAC) address of the respective image forming apparatus 1. The apparatus identification ID may be any information as long as the information can uniquely identify each image forming apparatus 1. The installation location indicates a location where each image forming apparatus 1 is installed. The installation location may be represented by latitude and longitude, or may be represented by a region. The adjustment information represents the adjustment information transmitted from each respective image forming apparatus 1.

FIG. 7 is a diagram illustrating an example of the applied voltage adjustment value table according to the embodiment. In the applied voltage adjustment value table, the value of the applied voltage for each combination of the adjustment value and the humidity is registered. The adjustment value "4" in the applied voltage adjustment value table is a reference adjustment value. In the applied voltage adjustment value table shown in FIG. 7, values from "1" to "7" are registered as adjustment values, but the range of the numerical values of the adjustment values is not particularly limited.

The applied voltage adjustment value table is stored in the auxiliary storage device 23 of the server system 2 in each combination of the type of paper, the print mode, and the print surface. For example, the server system 2 stores one applied voltage adjustment value table with a combination of "plain paper", "color", and "front surface". For example, the server system 2 stores one applied voltage adjustment value table with a combination of "plain paper", "color", and "back surface". For example, the server system 2 stores one applied voltage adjustment value table with a combination of "plain paper", "monochrome", and "front surface". For example, the server system 2 stores one applied voltage adjustment value table with a combination of "plain paper", "monochrome", and "back surface".

FIG. 8 is a flowchart illustrating a flow of adjustment information transmission processing performed by the image forming apparatus 1 according to the embodiment. FIG. 8 shows a case where the adjustment information is transmitted to the server system 2 at a time when the adjustment value is input. The processing of FIG. 8 is executed when a transfer bias adjustment instruction is issued by a user. First, the control unit 71 receives an input of a type of paper, a print mode setting, and a paper surface setting on the control panel 20 (ACT 101). The control unit 71 controls the image forming unit 30 and the fixing device 50 to print an image sample according to the input settings (ACT 102).

Figure 9:
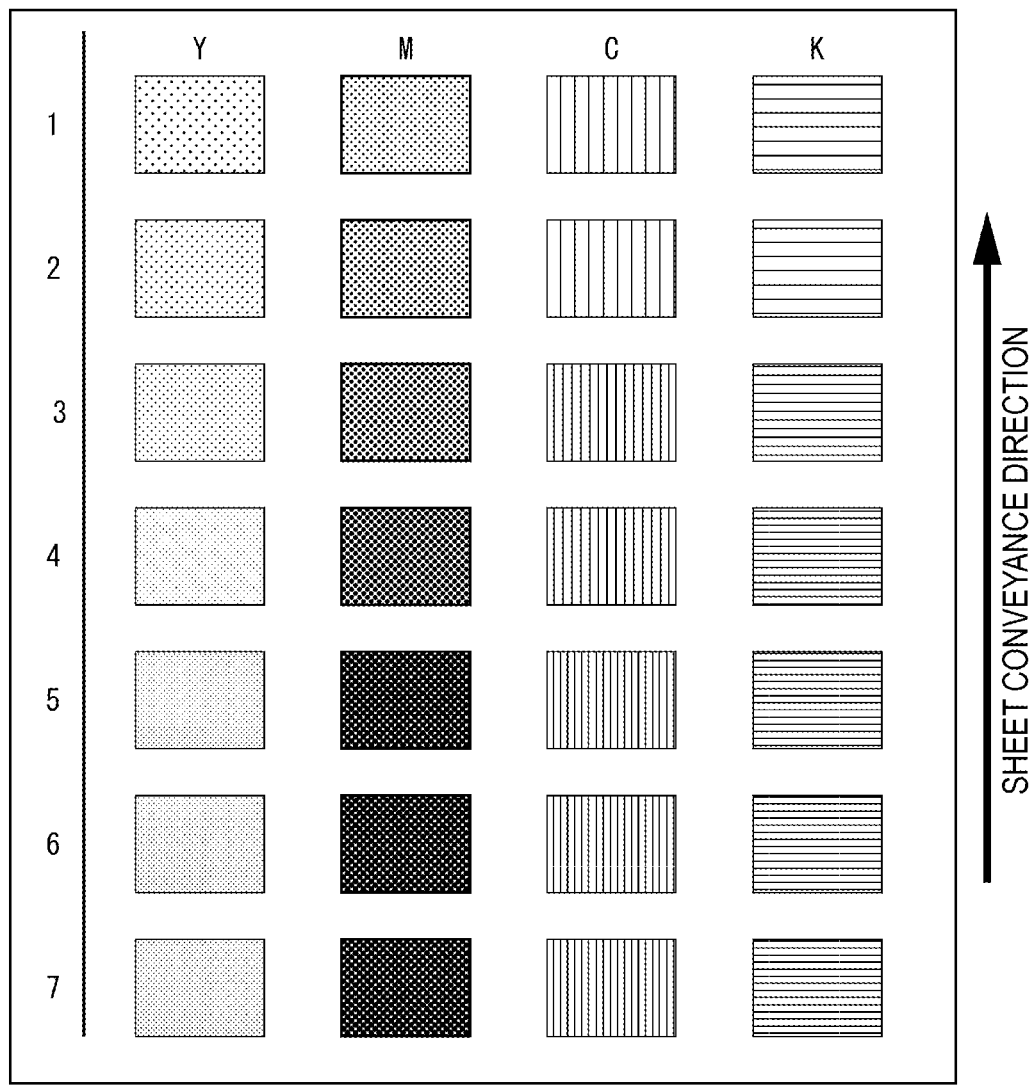
FIG. 9 is a diagram illustrating an example of an image sample according to the embodiment.

FIG. 9 is a diagram illustrating an example of an image sample according to the embodiment. FIG. 9 illustrates an image sample when the color mode is set. On the image sample, patches having different densities in the sheet conveyance direction are continuously printed. For example, printing is continuously performed so that the density becomes lower each time the paper is moved in the sheet conveyance direction. The values "1" to "7" described in the image sample are adjustment values. The patch corresponding to the adjustment value "4" indicates the density when printing is performed at the reference voltage in the image forming apparatus 1 that printed the image sample. The user can determine which density printing is appropriate by looking at the image sample. Even if the value of the reference voltage is the same, the density of the patch corresponding to the adjustment value "4" in the image sample differs depending on the environment inside the apparatus. Therefore, the user adjusts the adjustment value to obtain an appropriate density by looking at the image sample.

The controller 71 causes the control panel 20 to display an adjustment screen when the printing of the image sample is completed (ACT 103). The timing at which the printing of the image sample is completed may be the timing at which the image sample is discharged to the discharge unit, or the timing at which the fixing process by the fixing device 50 is completed. The fact that the sheet is discharged to the discharge unit or that the fixing process by the fixing device 50 is ended may be detected by a sensor (not shown). The control unit 71 may cause the control panel 20 to display the adjustment screen at the timing when the process of the ACT 101 ends.

Figure 10:
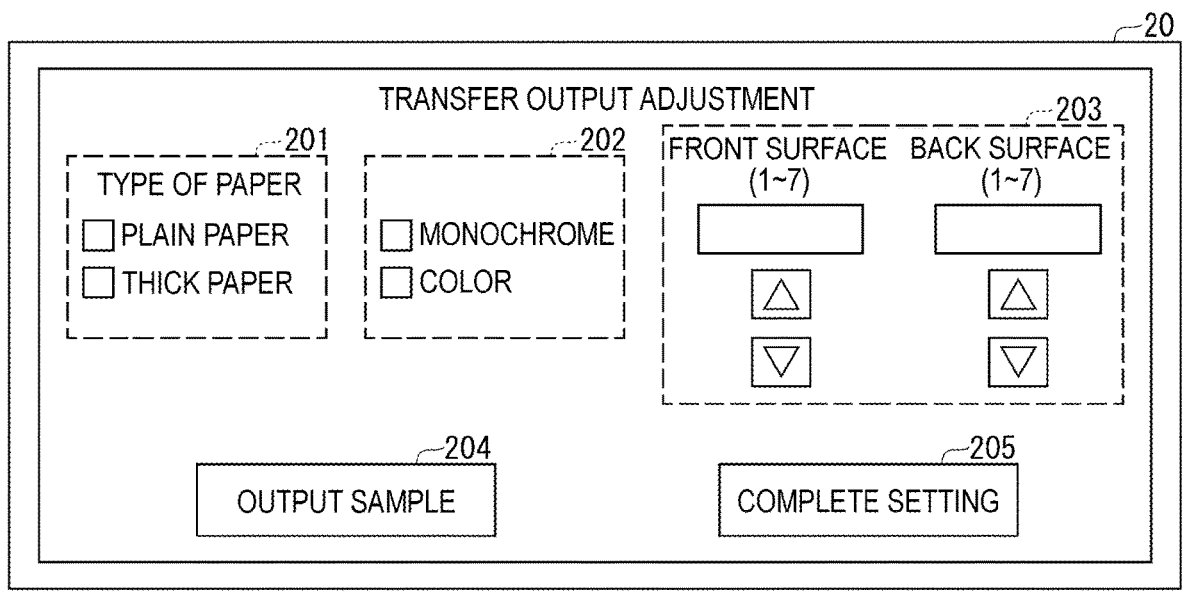
FIG. 10 is a diagram illustrating an example of an adjustment screen according to the embodiment.

FIG. 10 is a diagram illustrating an example of the adjustment screen according to the embodiment. As shown in FIG. 10, a paper display area 201, a print mode display area 202, an adjustment value input area 203, a sample output button 204, and a setting completion button 205 are displayed on the adjustment screen. The paper display area 201 is an area where paper type information is displayed. In FIG. 10, plain paper and thick paper are displayed in the paper display area 201. In the paper display area 201, a checkmark is displayed in a checkbox corresponding to the type of paper input in ACT 101. When the user desires to change the type of paper, the user changes the type of paper by selecting a checkbox corresponding to the desired type of paper.

The print mode display area 202 is an area where print mode information is displayed. In FIG. 10, monochrome and color are displayed in the print mode display area 202. In the print mode display area 202, a checkmark is displayed in a checkbox corresponding to the print mode input in ACT 101. When the user desires to change the print mode, the user changes the print mode by selecting a checkbox corresponding to the desired print mode.

The adjustment value input area 203 is an area for inputting an adjustment value. When an increase or decrease setting is performed using the up or down key displayed in the adjustment value input area 203, the adjustment value used in the image forming apparatus 1 is changed. For example, when the adjustment value is "5", the voltage in the body is varied accordingly to increase by a predetermined value (for example, increase by 20%) with respect to the reference voltage. In the adjustment value input area 203, the adjustment value stored in the auxiliary storage device 23 is displayed as a default. For example, when plain paper and monochrome are selected, the adjustment value stored for the combination of the plain paper, monochrome, and front surface as the adjustment value for the front surface is displayed as a default. For example, when plain paper and monochrome are selected, the adjustment value stored for the combination of the plain paper, monochrome, and back surface as the adjustment value for the back surface is displayed as a default. The sample output button 204 is a button used when printing an image sample. When the sample output button 204 is selected, the image forming apparatus 1 executes the process of ACT 102. When the sample output button 204 is selected, an image sample of the condition set on the adjustment screen shown in FIG. 10 is output. The setting completion button 205 is a button used when setting the adjustment value input to the adjustment value input area 203 in the image forming apparatus 1.

The control unit 71 receives an input of an adjustment value from the adjustment screen (ACT 104). When the adjustment value is input, that is, the adjustment value is set, the control unit 71 controls the network interface 130 to transmit the generated adjustment information to the server system 2 (ACT 105). Specifically, the control unit 71 generates and transmits adjustment information including adjustment values for the front surface and the back surface, information indicating a print mode, environmental information, and a type of paper. The control unit 71 may include the print result of the sample and the like and information regarding the measured voltage in the adjustment information in addition to the adjustment values of the front surface and the back surface, information indicating the print mode, environmental information, and the type of paper.

Figure 11:
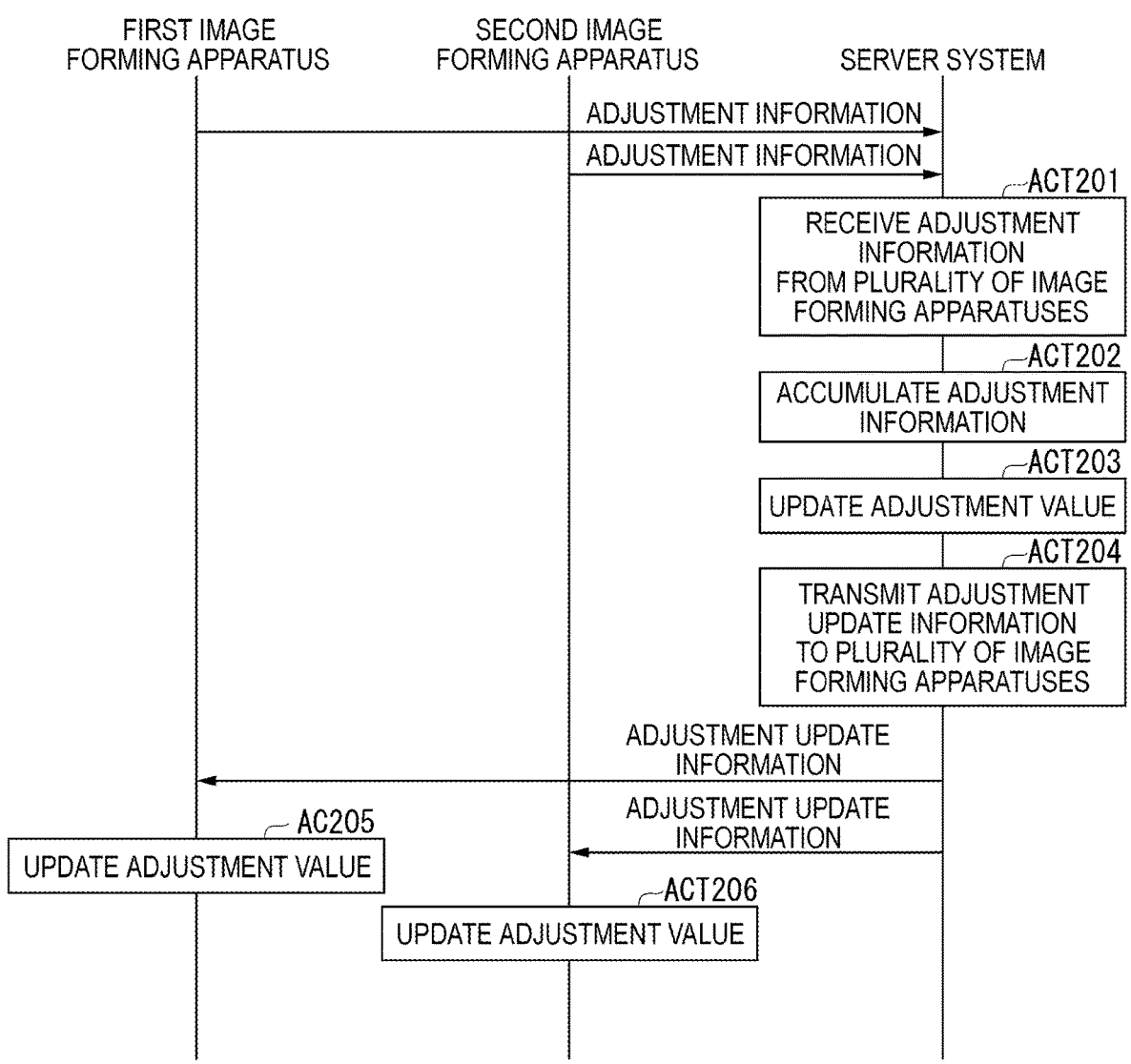
FIG. 11 is a sequence diagram illustrating a flow of adjustment processing of the image forming system.

FIG. 11 is a sequence diagram illustrating a flow of adjustment processing of the image forming system 100 according to the embodiment. In the description of FIG. 11, the plurality of image forming apparatuses 1 will be described as a first image forming apparatus 1 and a second image forming apparatus 1, respectively. The communication unit 22 of the server system 2 receives the adjustment information transmitted from each of the first image forming apparatus 1 and the second image forming apparatus 1 (ACT 201). The first image forming apparatus 1 and the second image forming apparatus 1 may transmit the adjustment information to the server system 2 at the time of adjusting the adjustment value or at a predetermined timing. The control unit 21 of the server system 2 accumulates the received adjustment information in the auxiliary storage device 23 (ACT 202). Specifically, the control unit 21 reads the image forming apparatus information table stored in the auxiliary storage device 23. The control unit 21 selects a record corresponding to the apparatus identification ID of the image forming apparatus 1 that is the transmission source of the adjustment information from the read records of the image forming apparatus information table. The control unit 21 accumulates the adjustment information by registering the obtained adjustment information in the item of the adjustment information of the selected record.

The control unit 21 uses the accumulated adjustment information to determine an adjustment value to be used in each of the first image forming apparatus 1 and the second image forming apparatus 1 by a statistical operation (ACT 203). The control unit 21 executes the process of determining the adjustment value at a predetermined timing (for example, once a week, once a month, and the like). Specifically, first, the control unit 21 generates a table in which the apparatus identification ID, the humidity, and the adjustment value, which are accumulated in the image forming apparatus information table, are associated with each other. This process is performed for each combination of the print mode, the type of paper, the front surface and the back surface of the same group.

Whether the group is the same group is determined based on the installation location, the IP address of the image forming apparatus 1, and/or the group arbitrarily grouped by a user. In the present embodiment, an example will be described in which the same group is determined based on the installation location. For example, when the installation location of the image forming apparatus 1 is within a predetermined range (the same building, the same district, or the like), the control unit 21 determines that the image forming apparatuses 1 located within the predetermined range belong to the same group. Here, it is assumed that the first image forming apparatus 1 and the second image forming apparatus 1 are in the same group.

Next, the control unit 21 uses the generated table to count the number of image forming apparatuses 1 belonging to the same group and having the same combination of the print mode, the type of paper, the front surface and the back surface for each adjustment value. For example, the control unit 21 counts the total number of image forming apparatuses 1 with the adjustment value of "7" the total number of image forming apparatuses 1 with the adjustment value of "6", and so on for each adjustment value. Then, the control unit 21 uses the counted total number of image forming apparatuses 1 to calculate the average value of all adjustment values used in the image forming apparatuses 1 belonging to the same group and having the same combination of the print mode, the type of paper, the front surface and the back surface by the following equation (1). If the calculation result is a decimal, the control unit 21 converts the result to an integer by performing, for example, rounding off.

$$\text{Average value of the whole} = \{7\times(\text{total number of image forming apparatuses whose adjustment value is "7"}) + 6\times(\text{total number of image forming apparatuses whose adjustment value is classified as "6"}) + \ldots + 1\times(\text{total number of image forming apparatuses whose adjustment value is "1"})\} \div \text{total number of image forming apparatuses belonging to the same group and having the same combination of the print mode, the type of paper, the front surface and the back surface} \quad \text{Equation (1)}$$

Then, the control unit 21 determines the calculated average value of the whole as an adjustment value to be used in the group. In this case, the same adjustment value is obtained at all humidity levels (for example, 0 to 100%). The control unit 21 generates adjustment update information including the determined adjustment value. The control unit 21 controls the communication unit 22 to transmit the generated adjustment update information to the first image forming apparatus 1 and the second image forming apparatus 1 (ACT 204).

The network interface 130 of the first image forming apparatus 1 receives the adjustment update information transmitted from the server system 2. The control unit 71 of the first image forming apparatus 1 updates the adjustment value based on the received adjustment update information (ACT 205). The network interface 130 of the second image forming apparatus 1 receives the adjustment update information transmitted from the server system 2. The control unit 71 of the second image forming apparatus 1 updates the adjustment value based on the received adjustment update information (ACT 206).

According to the image forming system 100 configured as described above, the server system 2 collects adjustment information from the plurality of image forming apparatuses 1. The server system 2 uses the collected adjustment information to determine an adjustment value to be used in each of the plurality of image forming apparatuses 1. Then, the server system 2 transmits the adjustment update information including the determined adjustment value to each of the plurality of image forming apparatuses 1. The plurality of image forming apparatuses 1 update the adjustment values using the adjustment update information transmitted from the server system 2. Then, the plurality of image forming apparatuses 1 perform printing by applying an applied voltage corresponding to the updated adjustment value. As a result, it is possible to eliminate transfer failure due to variations in sheet resistance and to provide stable image quality.

In the above equation (1), the adjustment value is the same regardless of the humidity. For this reason, the case where the adjustment value is affected by humidity may be also considered. Here, the image forming apparatus 1 may be configured to determine the adjustment value for each humidity level. In the case of such a configuration, the control unit 21 uses the generated table to count the number of image forming apparatuses 1 belonging to the same group and having the same combination of the print mode, the type of paper, the front surface and the back surface for each adjustment value of each humidity category. For example, the control unit 21 counts the total number of image forming apparatuses 1 having a humidity level of "0 to 10%" for each adjustment value, . . . , the total number of image forming apparatuses 1 having a humidity level of "90 to 100%" for each adjustment value. Thus, for example, the number of image forming apparatuses 1 is obtained for each adjustment value in each humidity category. Then, the control unit 21 determines an adjustment value with a maximum number of the image forming apparatuses 1 for each humidity category. The control unit 21 determines the determined adjustment value as an adjustment value to be used for each humidity category in the group. As a result, a different adjustment value is determined for each humidity category.

Another example in which the adjustment value is determined for each humidity level will be described. The control unit 21 may calculate the average value of the adjustment values for each humidity category by applying the above equation (1) for each humidity category. In this case, in the above equation (1), the total number of image forming apparatuses belonging to the same group and having the same combination of the print mode, the type of paper, the front surface and the back surface becomes the total number of image forming apparatuses of each humidity category.

Some functions of the image forming apparatus 1 in the above-described embodiment may be realized by a computer. In that case, a program for realizing this function is recorded on a computer-readable recording medium. Then, the function may be realized by causing a computer system to read and execute the program recorded on a recording medium on which the above-described program is recorded. Here, the "computer system" includes an operating system and hardware such as peripheral devices. The "computer-readable recording medium" refers to a portable medium, a storage device, or the like. The portable medium is a flexible disk, a magneto-optical disk, a ROM, a CD-ROM, or the like. The storage device is a hard disk or the like built in the computer system. The "computer-readable recording medium" dynamically stores the program for a short time, such as a communication line when transmitting the program via a communication line. The communication line is a network such as the Internet, a telephone line, or the like. The "computer-readable recording medium" may be a volatile memory inside a computer system serving as a server or a client. The volatile memory stores programs for a certain period of time. The program may be for realizing a part of the functions described above. The program may be a program that can realize the above-described functions in combination with a program already recorded in a computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A server comprising:
a communications interface configured to facilitate communication with a plurality of image forming apparatuses; and
a controller configured to:
receive adjustment information from each of the plurality of images forming apparatuses via the communications interface, wherein the adjustment information includes an adjustment value of a voltage applied at a time of transfer of an image to a piece of paper by each of the plurality of image forming apparatuses;
determine an updated adjustment value to be used in each of the plurality of image forming apparatuses based on the adjustment information received from of each of the plurality of image forming apparatuses; and
transmit adjustment update information including the updated adjustment value to each of the plurality of image forming apparatuses via the communications interface;
wherein the controller is configured to perform an updated adjustment value determination process to determine the updated adjustment value; and
wherein, during the updated adjustment determination process, the controller is configured to:
identify a number of image forming apparatuses of the plurality of image forming apparatuses that transmitted a respective adjustment value to the server for each of a plurality of possible adjustment values;
determine a weighted value for each respective adjustment value of the plurality of possible adjustment values by multiplying (i) each respective adjustment value of the plurality of possible adjustment values by (ii) the number of image forming apparatuses that transmitted the respective adjustment value;
aggregate the weighted values to determine a sum of the weighted values; and
divide the sum of the weighted values by a total number of the plurality of image forming apparatuses to determine the updated adjustment value.

2. The server of claim 1, wherein each of the plurality of image forming apparatuses is configured to control the voltage applied at a future time of transfer based on the updated adjustment value.

3. The server of claim 1, wherein the adjustment value is selected according to a user operation at each of the plurality of image forming apparatuses.

4. The server of claim 3, wherein the adjustment value is selected from the plurality of possible adjustment values.

5. The server of claim 1, wherein, during the updated adjustment determination process, the controller is configured to:
identify the number of image forming apparatuses of the plurality of image forming apparatuses that (i) transmitted a respective adjustment value to the server and (ii) are operating within a respective one of a plurality of predetermined humidity ranges for each of the plurality of possible adjustment values; and
determine the weighted value for each respective adjustment value of the plurality of possible adjustment values by multiplying (i) each respective adjustment value of the plurality of possible adjustment values by (ii) the number of image forming apparatuses that transmitted the respective adjustment value and are operating within the respective one of the plurality of predetermined humidity ranges;
aggregate the weighted values to determine the sum of the weighted values; and
divide the sum of the weighted values by the total number of the plurality of image forming apparatuses operating within the respective one of the plurality of predetermined humidity ranges to determine the updated adjustment value for the plurality of image forming apparatuses that are operating within the respective one of the plurality of predetermined humidity ranges.

6. The server of claim 5, wherein the controller is configured to perform the updated adjustment value determination process for each of the plurality of predetermined humidity ranges.

7. A method for adjusting voltage in an image forming system including a plurality of image forming apparatuses and a server, the method comprising:
receiving, by the server, adjustment information from the plurality of image forming apparatuses, wherein the adjustment information includes an adjustment value of a voltage applied at a time of transfer of an image to a piece of paper by each of the plurality of image forming apparatuses, and wherein the adjustment value is selected from a plurality of possible adjustment values;
determining, by the server, an updated adjustment value to be used in each of the plurality of image forming apparatuses based on the adjustment information received from each of the plurality of image forming apparatuses; and
transmitting, by the server, adjustment update information including the updated adjustment value to each of the plurality of image forming apparatuses;
wherein determining the updated adjustment values includes performing, by the server, an updated adjustment value determination process to determine the updated adjustment value; and
wherein the updated adjustment determination process includes:
identifying a number of image forming apparatuses of the plurality of image forming apparatuses that transmitted a respective adjustment value to the server for each of the plurality of possible adjustment values;
determining a weighted value for each respective adjustment value of the plurality of possible adjustment values by multiplying (i) each respective adjustment value of the plurality of possible adjustment values by (ii) the number of image forming apparatuses that transmitted the respective adjustment value;
aggregating the weighted values to determine a sum of the weighted values; and
dividing the sum of the weighted values by a total number of the plurality of image forming apparatuses to determine the updated adjustment value.

8. The method of claim 7, further comprising controlling, by each of the plurality of image forming apparatuses, the voltage applied at a future time of transfer based on the updated adjustment value.

9. A method for adjusting voltage in an image forming system including a plurality of image forming apparatuses and a server, the method comprising:
- receiving, by the server, adjustment information from the plurality of image forming apparatuses, wherein the adjustment information includes an adjustment value of a voltage applied at a time of transfer of an image to a piece of paper by each of the plurality of image forming apparatuses, and wherein the adjustment value is selected from a plurality of possible adjustment values;
- determining, by the server, an updated adjustment value to be used in each of the plurality of image forming apparatuses based on the adjustment information received from each of the plurality of image forming apparatuses; and
- transmitting, by the server, adjustment update information including the updated adjustment value to each of the plurality of image forming apparatuses;
- wherein determining the updated adjustment values includes performing, by the server, an updated adjustment value determination process to determine the updated adjustment value; and
- wherein the updated adjustment determination process includes:
  - identifying a number of image forming apparatuses of the plurality of image forming apparatuses that (i) transmitted a respective adjustment value to the server and (ii) are operating within a respective one of a plurality of predetermined humidity ranges for each of the plurality of possible adjustment values;
  - determining a weighted value for each respective adjustment value of the plurality of possible adjustment values by multiplying (i) each respective adjustment value of the plurality of possible adjustment values by (ii) the number of image forming apparatuses that transmitted the respective adjustment value and are operating within the respective one of the plurality of predetermined humidity ranges;
  - aggregating the weighted values to determine a sum of the weighted values; and
  - dividing the sum of the weighted values by a total number of the plurality of image forming apparatuses operating within the respective one of the plurality of predetermined humidity ranges to determine the updated adjustment value for the plurality of image forming apparatuses that are operating within the respective one of the plurality of predetermined humidity ranges.

* * * * *